(12) United States Patent
Litvin

(10) Patent No.: US 6,788,839 B2
(45) Date of Patent: *Sep. 7, 2004

(54) TIME SLOT TUNABLE ALL-OPTICAL PACKET DATA ROUTING SWITCH

(75) Inventor: Kerry I. Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 400 days.

This patent is subject to a terminal disclaimer.

(21) Appl. No.: 09/811,749

(22) Filed: Mar. 19, 2001

(65) Prior Publication Data

US 2002/0131675 A1 Sep. 19, 2002

(51) Int. Cl.[7] .................................................. G02B 6/26
(52) U.S. Cl. .............................. 385/16; 385/11; 385/15; 385/24; 398/1; 398/52; 398/53; 398/101; 398/102
(58) Field of Search ............................. 385/15, 16, 11, 385/24, 39, 122; 398/79–88, 98, 101, 102, 1, 147, 52, 53

(56) References Cited

U.S. PATENT DOCUMENTS

| | | |
|---|---|---|
| 5,060,305 A | 10/1991 | Prucnal et al. |
| 5,073,980 A | 12/1991 | Prucnal et al. |
| 5,173,956 A | 12/1992 | Hayes |
| 5,493,433 A | 2/1996 | Prucnal et al. |
| 5,517,022 A | 5/1996 | Bock et al. |
| 5,555,119 A | 9/1996 | Lewis |
| 5,825,519 A | 10/1998 | Prucnal |
| 5,841,560 A | 11/1998 | Prucnal |
| 5,917,979 A | 6/1999 | Prucnal |
| 5,926,496 A | 7/1999 | Ho et al. |
| 5,999,293 A | 12/1999 | Manning |
| 6,188,511 B1 | 2/2001 | Marcenac et al. |

OTHER PUBLICATIONS

Nakamura et al., "168 Gbps Error–Free Demultiplexing with Hybrid–Integrated Symmetric Mach–Zehnder All–Optical Switch," Optical Fiber Conference 2000 Technology Digest, pp. 81–83, (Mar., 2000).

Sokoloff et al., "A Terahertz Optical Asymmetric Demultiplexer (TOAD)," IEEE Photonics Technology Letters, vol. 5, No. 7, pp. 787–790 (Jul., 1993).

Kang et al., "Ultrafast Optical Time Demultiplexers Using Semiconductor Optical Amplifiers," International Journal of High Speed Electronics and Systems, vol. 7, No. 1, pp. 125–151 (1996).

Glesk et al., "Demonstration of Ultrafast All–Optical Packet Routing," Electronics Letters, vol. 33, No. 9, pp. 794–795 (Apr., 1997).

Levy et al., "Fabrication of Ultracompact 3–db 2 x 2 MMI Power Splitters," IEEE Photonics Technology Letters, vol. 11, No. 8, pp. 1009–1011 (Aug., 1999).

(List continued on next page.)

Primary Examiner—Hemang Sanghavi
(74) Attorney, Agent, or Firm—Akin Gump Strauss Hauer & Feld, LLP

(57) ABSTRACT

A fully "time tunable" all-optical switch routes/switches digital bits (packets) in an all-optical format for transmission, or for further processing, in an all-optical communication network. The all-optical switch is implemented in either a semiconductor hybrid or in a completely monolithic form. Variable time delay elements adjust the time delay of a clocking signal input and a data packet input. The clocking signal determines the state of two nonlinear optical elements, such as semiconductor optical amplifiers, incorporated in the upper and lower arms of a Mach-Zehnder configuration. An optical coupler is connected to the output of the all-optical switch. The output of data from selected ports of the optical coupler is controlled using the variable time delay elements.

13 Claims, 9 Drawing Sheets-

OTHER PUBLICATIONS

Chin et al., "Design and Modeling of Waveguide–Coupled Single–Mode Microring Resonators," Journal of Lightwave Technology, vol. 16, No. 8, pp. 1433–1446 (Aug., 1998).

International Preliminary Examination Report (IPER) for PCT/US02/06850, mailed Mar. 26, 2003, 11 pages.

Leuthold, J. et al., "All–Optical Mach–Zehnder Interferometer Wavelength Converters and Switches with Integrated Data–and Control–Signal Separation Scheme," Journal of Lightwave Technology, IEEE. vol. 17, No. 6, Jun. 1999, pp. 1056–1065.

International Search Report for PCT Application No. PCT/US02/06850, mail date Jul. 18, 2002, 3 pages.

Tajima, K. et al: "Ultrafast Semiconductor All–Optical Switch Based on Highly Efficient Incoherent Nonlinearity with Slow Relaxation" Optoelectronics Devices and Technologies, Mita Press, Tokyo, JP, vol. 10, No. 4, Dec. 1, 1995, pp. 505–514.

Riza, N.A.: "Acousto–optically Switched Optical Delay Lines", Optics Communications, North–Holland Publishing Company, Amsterdam, NL, vol. 145, No. 1–6, 1998, pp. 15–20.

Porte, H. et al.: An $LiNbO_3$ Integrated Coherence Modulator, Journal of Lightwave Technology, IEEE. New York, US. vol. 10, No. 6, Jun. 1, 1992, pp. 760–766.

TIME SLOT TUNABLE ALL-OPTICAL PACKET DATA ROUTING SWITCH

CROSS-REFERENCE TO RELATED APPLICATIONS

This application is related to co-pending application Ser. No. 09/811,720, entitled "TIME SLOT TUNABLE ALL-OPTICAL PACKET DATA DEMULTIPLEXER," filed on Mar. 19, 2001.

BACKGROUND OF THE INVENTION

1. Field of the Invention

The present invention generally relates to all-optical switches and interferometers used for routing data.

2. Background Information

Conventional wavelength division multiplexing (WDM) systems efficiently use bandwidth in existing fiber-optic telecommunication infrastructures. Such systems provide point-to-point optical transmission at high aggregate rates (>100 Gb/s) without compromising on high performance. Future requirements of digital communication networks indicate that increased data-rate capacity is critical to a service provider's success in the market. Ultimately, all-optical networks will replace today's optical/electrical networks that suffer from the bottlenecking effects of optical-to-electrical-to-optical conversions due to the limited capacity of electronic devices. Devices that can optically process data without converting it to an electronic format are essential to this network capacity evolution.

Several forecasts have predicted that there will be a tremendous growth in the sensor market. In contrast to the classical sensors based largely upon the measurement of electrical parameters such as variable resistance or capacitance, modern sensors make use of a variety of novel phenomena. More importantly, these sensors are directly suitable for digital control and also have a degree of smartness incorporated in them to combat problems of nonlinearity and long term drift. Several key technologies are likely to play a major role in the sensors of the future. Microelectromechanical (MEM) sensors have tremendous potential as smart sensors. Fiber optics based sensors are also emerging as a viable and competitive technology. While many types of stand alone sensors are available, only some of them can be considered for integration with smart structures. Among these, fiber optic sensors are in the forefront in their choice for incorporation into materials and structures made of carbon and glass fiber reinforced polymer composites.

The advantages of fiber optic sensors (FOS) include freedom from EMI, wide bandwidth, compactness, geometric versatility and economy. In general, FOS is characterized by high sensitivity when compared to other types of sensors. FOS is also passive in nature due to the dielectric construction. Many signal processing devices (e.g., splitters, combiners, multiplexers, filters, delay lines) can also be made of fiber elements, thus enabling the realization of an all-fiber measuring system. Recently, photonic circuits (Integrated Optics) has been proposed as a single chip optical device or signal processing element which enables miniaturization, batch production, economy and enhanced capabilities.

A fiber optic sensor in general consists of a source of light, a length of sensing (and transmission) fiber, a photodetector, demodulation, processing and display optics and the required electronics. Interferometric (phase) sensors are based on the detection of changes in the phase of light emerging out of a single mode fiber. Interferometric fiber optic sensors are by far the most commonly used sensors since they offer the best performance.

A deficiency with prior art interferometers is that they cannot be "time tuned" to handle different switching requirements. Presently, a different interferometer must be used for different data stream routing applications.

BRIEF SUMMARY OF THE INVENTION

The present invention provides for the use of an integrated optical coupler (e.g., a quadrature coupler) at the output of a demultiplexer device which transforms the functionality of the component into an integrated all-optical routing (switching) element.

The present invention also provides for the use of one or more variable time delay elements that enable the selection of desired bits or groups of bits in an all-optical data packet or all-optical data burst for routing onto one of two possible paths of the optical coupler.

The present invention also provides for the monolithic integration of a variety of optical device structures construing the present invention, which together may be used to produce superior performance and increased utility over the prior art.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DESCRIPTION OF THE INVENTION

1. Overview

Figure 1:
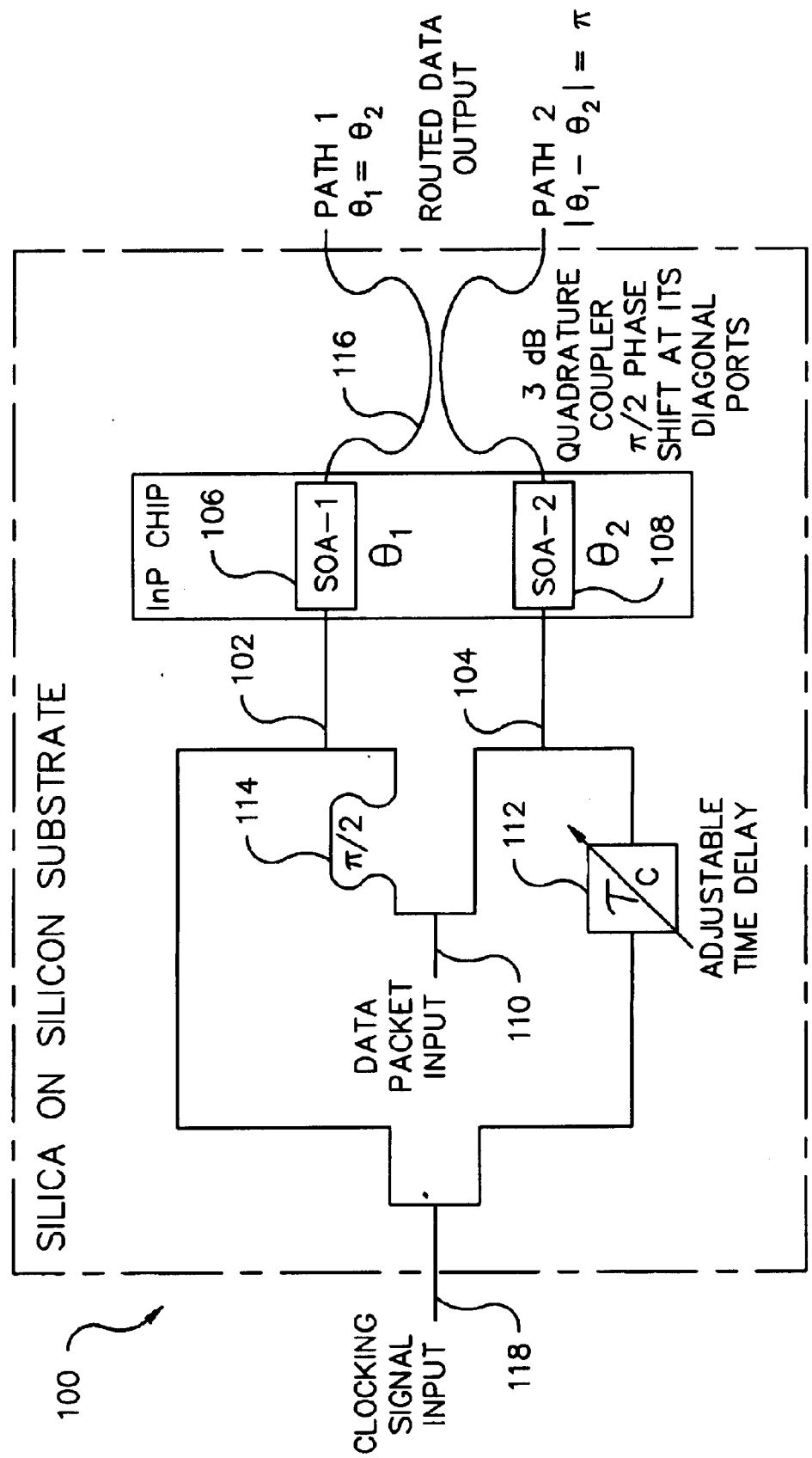
FIG. 1 shows a hybrid all-optical packet data routing chip with a single adjustable time delay in accordance with the present invention.

FIG. 1 shows an all-optical routing switch 100 in semiconductor hybrid form in accordance with the present invention. The all-optical routing switch 100 comprises first and second arms 102, 104, each arm having a nonlinear optical element 106, 108, respectively, for receiving a data stream from data packet input 110. All-optical routing switch 100 also includes time delay element 112 having an adjustable time delay value $\tau_c$, a fixed time delay element 114 having a fixed value of $\pi/2$, and an optical coupler 116 having plural outputs (path 1, path 2). The value of the time delay element 112 is adjusted as desired to determine which output of the optical coupler 116 that individual data bits or groups of data bits in the data stream are to be routed to. A clocking signal (control pulse signal) is fed into clocking signal input 118. The first and second arms 102, 104 in which nonlinear optical elements 106, 108 are inserted may constitute a Mach-Zehnder configuration. The optical coupler 116 may be a four port device placed at the output of all-optical routing switch 100. The outputs of the nonlinear optical elements 106, 108 may be fed into the input ports of the optical coupler 116.

Figure 2:
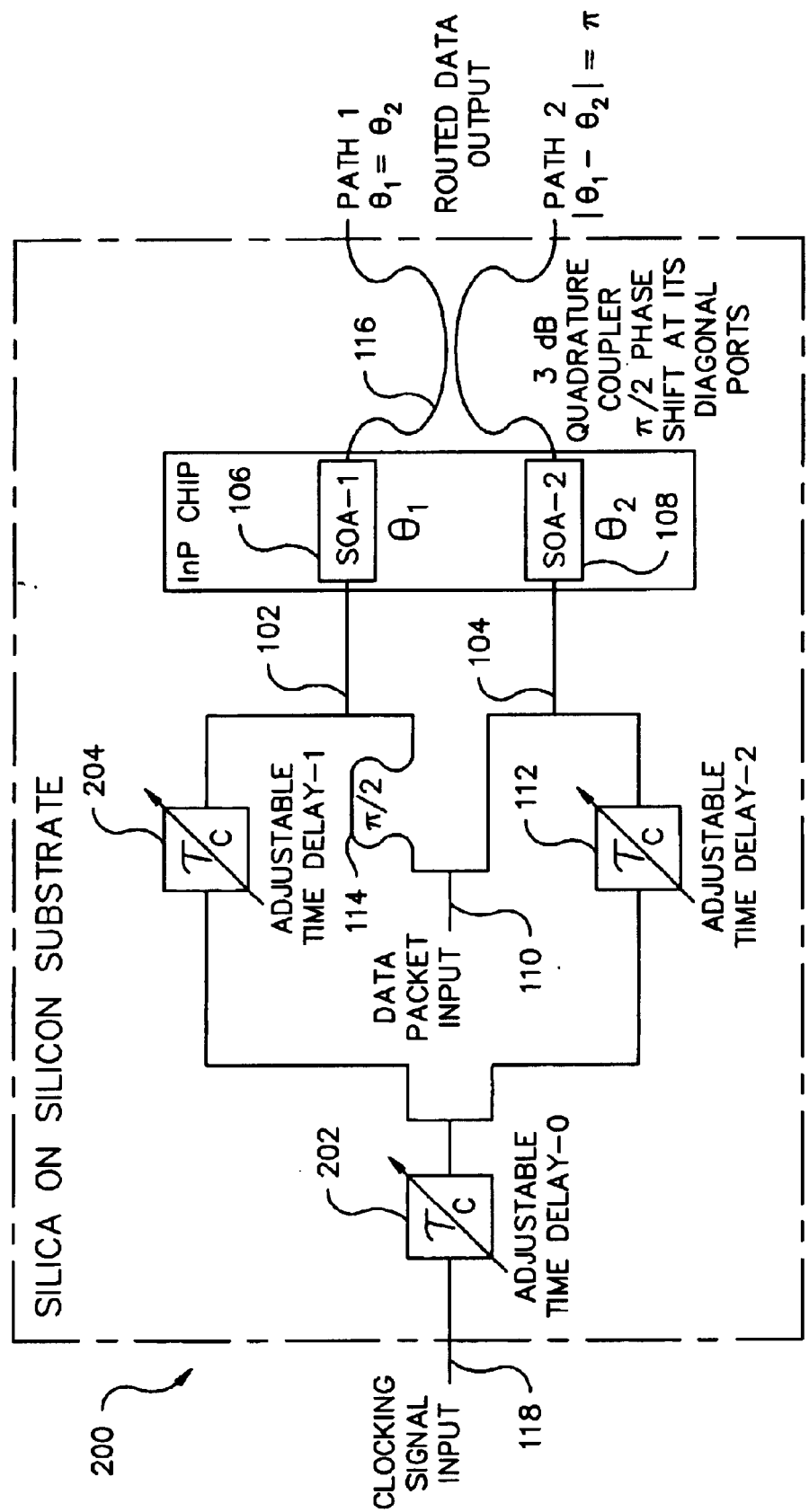
FIG. 2 shows a hybrid all-optical packet data routing chip with multiple adjustable time delays in accordance with the present invention.

FIG. 2 shows an all-optical routing switch 200 in semiconductor hybrid form in accordance with the present invention. The all-optical routing switch 200 is similar to that shown in FIG. 1, with the exception that the all-optical routing switch 200 has two additional time delay elements 202, 204, each having an adjustable time delay value $\tau_c$. The time delay values of time delay elements 112, 202, 204 are varied to delay input signals that control the states of the nonlinear optical elements 106, 108. The inputted data in the data stream received via data packet input 110 may also be delayed.

The adjustable time delay elements 112, 202, 204 may be designed using several manufacturing techniques as follows:

(1) The time delay elements may consist of a material of variable thickness in the shape of a wedge or a staircase.

(2) The time delay elements may comprise a plurality of optical waveguides of various lengths.

(3) The time delay elements may contain a heating element which changes the properties of an optical waveguide when an electrical current is passed through the heating element.

(4) The time delay elements may comprise a waveguide having a variable index of refraction.

(5) The time delay elements may comprise an optical buffer having a recirculating optical waveguide loop.

(6) The time delay elements may comprise a material upon which an electro-optic effect is imposed.

Numerous other time delaying techniques may be incorporated into the present invention.

Figure 3:
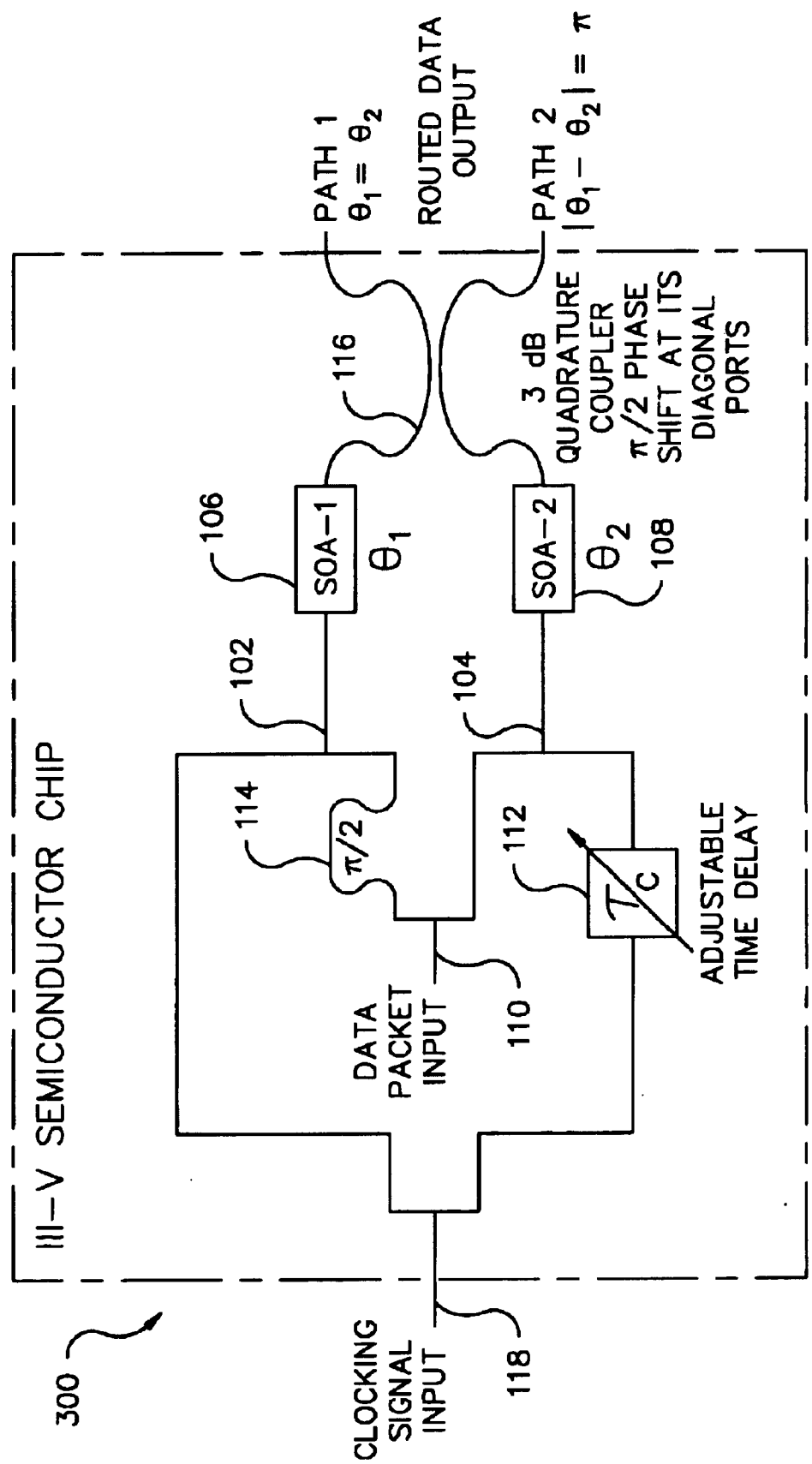
FIG. 3 shows a monolithic all-optical packet data routing chip with a single adjustable time delay in accordance with the present invention.
Figure 4:
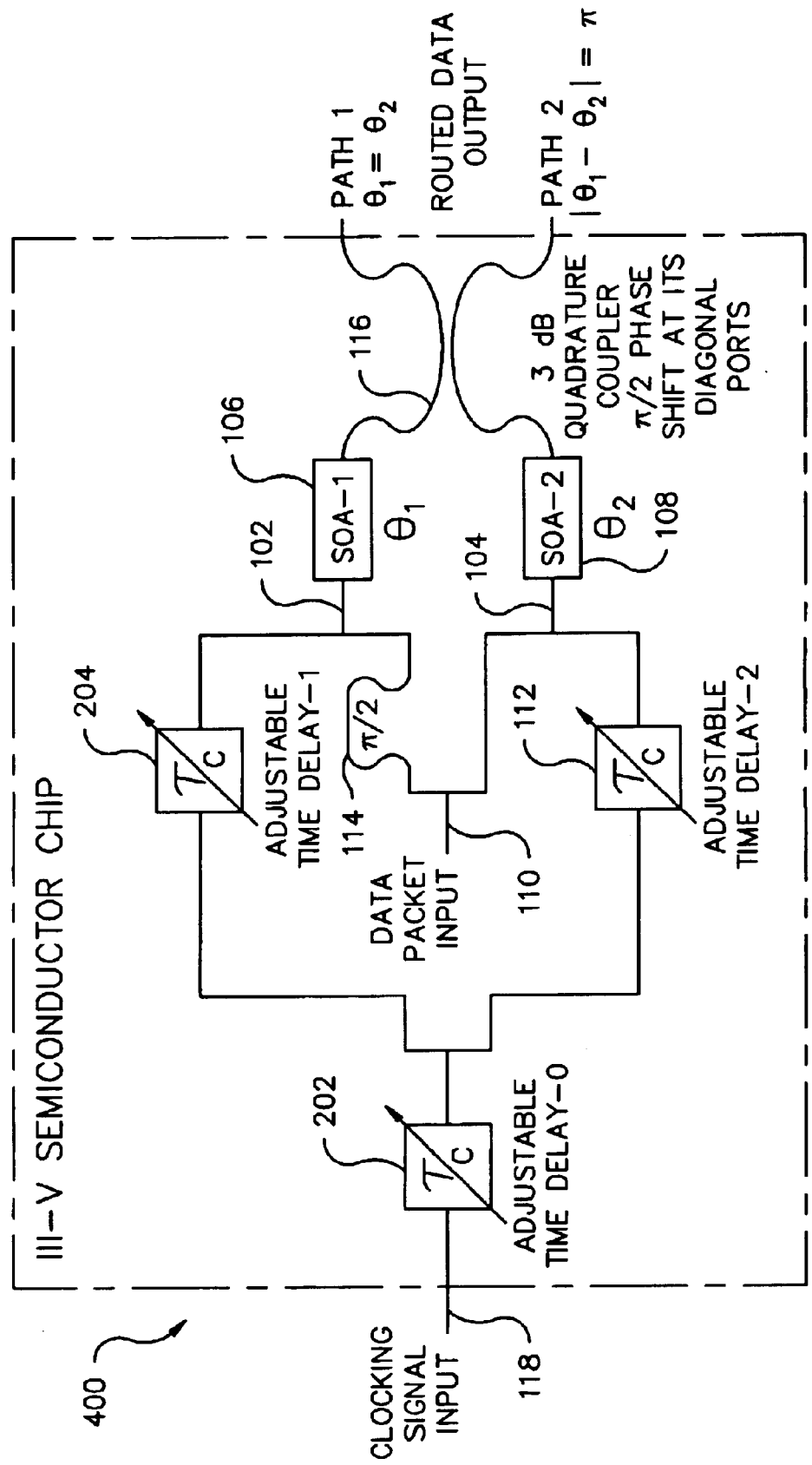
FIG. 4 shows a monolithic all-optical packet data routing chip with multiple adjustable time delays in accordance with the present invention.

FIGS. 3 and 4 show all-optical routing switches 300 and 400, similar to all-optical routing switches 100 and 200, respectively, with the exception that all-optical routing switches 300 and 400 are monolithically integrated assemblies implemented using III–V compound semiconductor materials such as those typically grown on InP or GaAs substrates.

2. Detailed Description

FIG. 2 shows a hybrid all-optical routing switch 200 which is used to route/switch digital bits (packets) in an all-optical format for transmission, or for further signal processing. The all-optical routing switch 200 utilizes destructive and constructive wave interference created by the nonlinear effects of the nonlinear optical elements 106, 108 located in the parallel arms 102, 104 of a Mach-Zehnder interferometer in conjunction with the variable time delays 112, 202, 204, and the optical coupler 116 to create an extremely fast all-optical routing switch that can be used to route an individual bit or groups of bits in an all-optical data packet onto one of two possible paths. The all-optical routing switch 200 may even be used to route an entire data packet.

The all-optical routing switch 200 is used to route a single bit or a stream of bits being transmitted in an all-optical format. The all-optical routing switch 200 takes advantage of the extremely short period of time that it takes for the nonlinear optical elements 106, 108 to saturate. During the interval of time that the nonlinear optical elements 106, 108 are saturated, the index of refraction of the semiconductor material is different from the steady-state value. Thus, an optical wave propagating through the nonlinear optical elements 106, 108 during a period of time when the all-optical routing switch 200 is in a saturated state will move at a different velocity then it would ordinarily transit had it been within the device while it was in a normal steady-state condition. This difference in velocity, due to the saturation condition, implies a difference in travel time through the all-optical routing switch 200 which, in turn, translates into a phase difference that is used to create both destructive and constructive interference effects. The coherent wave interference phenomena can be controlled in a very fast, yet precisely timed manner, to achieve the desired functionality of the devices described herein. The control comes about via the application of an optical clock pulse which is timed in a manner so as to effect the saturation condition of the nonlinear optical elements 106, 108 during the interval of time when the optical bits need to be routed, for further signal processing, or switched onto another path for routing in network transmissions.

FIGS. 1–4 show that the data stream enters the all-optical routing switch at the data packet input 110. The single input data stream is then divided into two equal power streams by a 3 dB integrated optical power divider. The upper data stream has an additional phase shift of $\pi/2$ radians imparted upon it, relative to the lower path, by the fixed time delay element 114. The fixed time delay element 114 may consist of a delay line of appropriate length constructed from an integrated optical waveguide.

A clocking signal (control pulse signal) is transmitted into the device at the clocking signal input 118. The clocking signal is immediately split into two clocking signals of equal amplitude and equal phase by a 3 dB integrated optical power divider.

The upper half of the clocking signal is combined with the upper half of the data stream in a 3 dB integrated optical combiner. The signals are then passed on to the nonlinear optical element 106 (SOA-1), which resides in the upper arm of an integrated Mach-Zehnder interferometer. The lower half of the clocking signal is time delayed by the adjustable time delay element 112 and then combined with the lower half of the data stream signal in a 3 dB integrated optical power combiner. These signals are then passed on to the nonlinear optical element 108 (SOA-2). The outputs of the nonlinear optical elements 106, 108 are combined in the optical coupler 116. Optical coupler 116 may be a 3 dB quadrature coupler. The optical coupler 116 imparts a phase shift of $\pi/2$ radians upon signals exiting from its diagonal (crossover) ports and no phase shift upon the signal exiting from its in-line port. "Diagonal" and "in-line" are defined relative to the input port at which the signal enters optical coupler 116. An output signal will emerge either from the port marked "Path 1" or the port marked "Path 2," depending upon the relative phases of the two output signals of the nonlinear optical elements 106, 108 which feed into optical coupler 116.

The switching of data to either the "Path 1" output or the "Path 2" output will now be described. The clocking pulse is set-up such that its amplitude (after the 3 dB split and any time delays) is adequate to saturate both of the nonlinear optical elements 106, 108 when the clock pulse arrives at the devices. Furthermore, the nonlinear optical elements 106, 108 are set-up via their dc bias conditions, in conjunction with the saturated state, to impart a phase difference of π radians (180 degrees) relative to the unsaturated state. Thus, during any period of time when the data signal experiences one of the two nonlinear optical elements 106, 108 in a saturated state while the other nonlinear optical element is in its steady-state condition, an additional π radian relative phase shift will be developed between the optical waves in the two paths of the all-optical switch. When these data signals are combined in the optical coupler 116, destructive interference will occur at the "Path 1" output port and constructive interference will occur at the "Path 2" output port. Thus, the data is switched onto "Path 2." During any period of time when the data signal experiences both nonlinear optical elements 106, 108 in identical states, either both saturated or both in the steady-state, there will not be an additional π radian relative phase shift developed between the two data waves passing through the arms of the all-optical routing switch. In this case, when the data signals are combined in the optical coupler 116, constructive interference will occur at the "Path 1" output port and destructive interference will occur at the "Path 2" output port. Thus, the data is switched onto "Path 1." By adjusting the variable time delay elements 112, 202, 204, the point in time when the data signal encounters the nonlinear optical elements 106, 108 in different or identical states is adjusted. Therefore, specific bits in the data stream can be routed to different paths by using an optical clock to control the switching action by changing the states of the nonlinear optical elements 106, 108 relative to one another in time.

Figure 6:
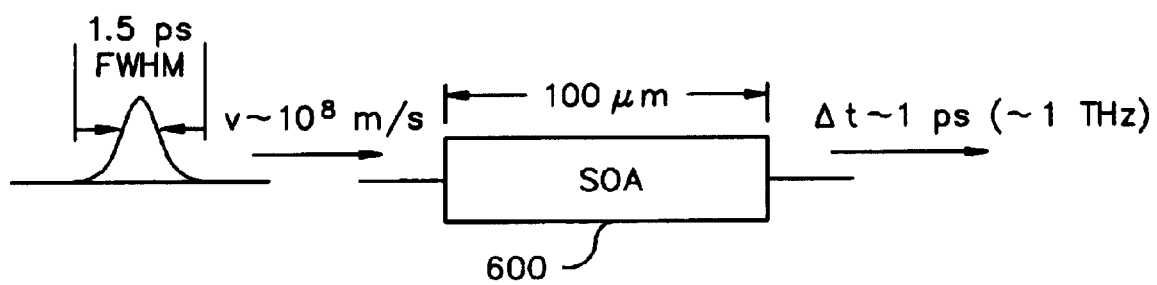
FIG. 6 shows a basic SOA transient operation in accordance with the present invention.

FIG. 6 illustrates the basic transient operation of an SOA 600 is illustrated. The SOA 600 will saturate and the carrier population depletion will be completed within about 1 ps (≅1 THz) from the time that the control (clock) pulse wavefront (full-width half-maximum (FWHM)≅1.5 ps) enters the SOA 600.

Figure 7:
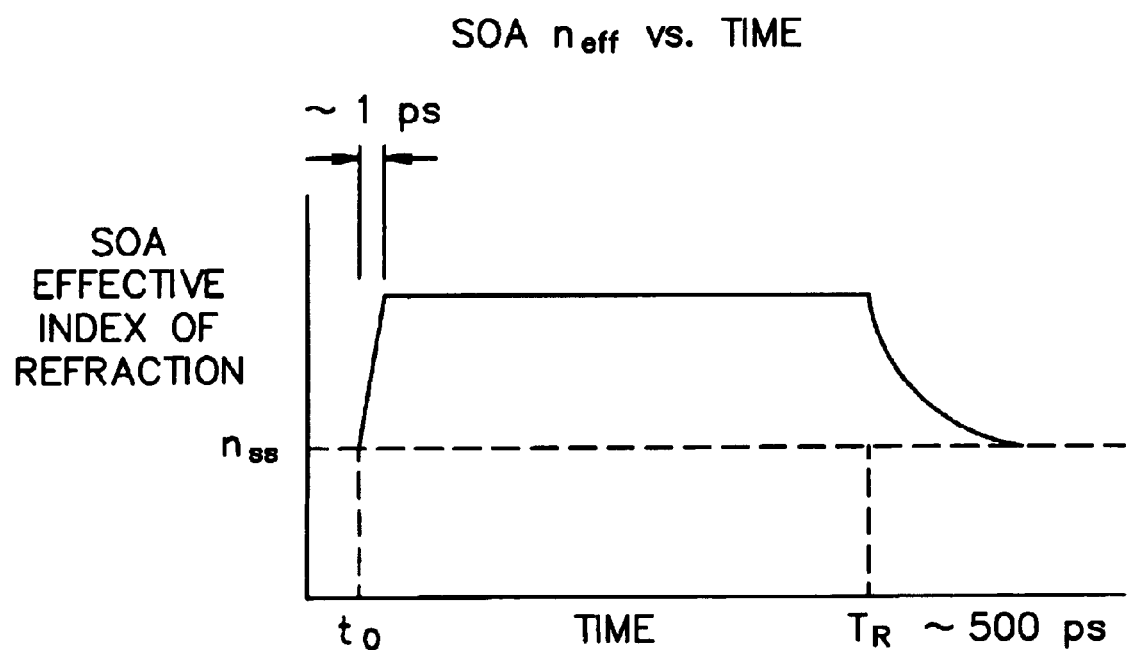
FIG. 7 shows the SOA's switching speed in accordance with the present invention.

FIG. 7 illustrates the SOA index of refraction over a period of time. The SOA will remain saturated for an extended period of time until it relaxes back to its steady-state condition of population inversion due to electrical pumping. The SOA has an extremely fast initial switching time due to the purely optical nature of the interaction. The relaxation takes about $T_R$=500 ps (=2 GHz). The delay in the restoration of the steady-state pumped condition can be substantially reduced (to only a few ps) by optically pumping the device. The recovery ($T_R$) back to its steady state is a much slower process because it is normally an electrical/statistical thermodynamic phenomenon. Applying an optical pump can speed up the recovery time.

Figure 8:
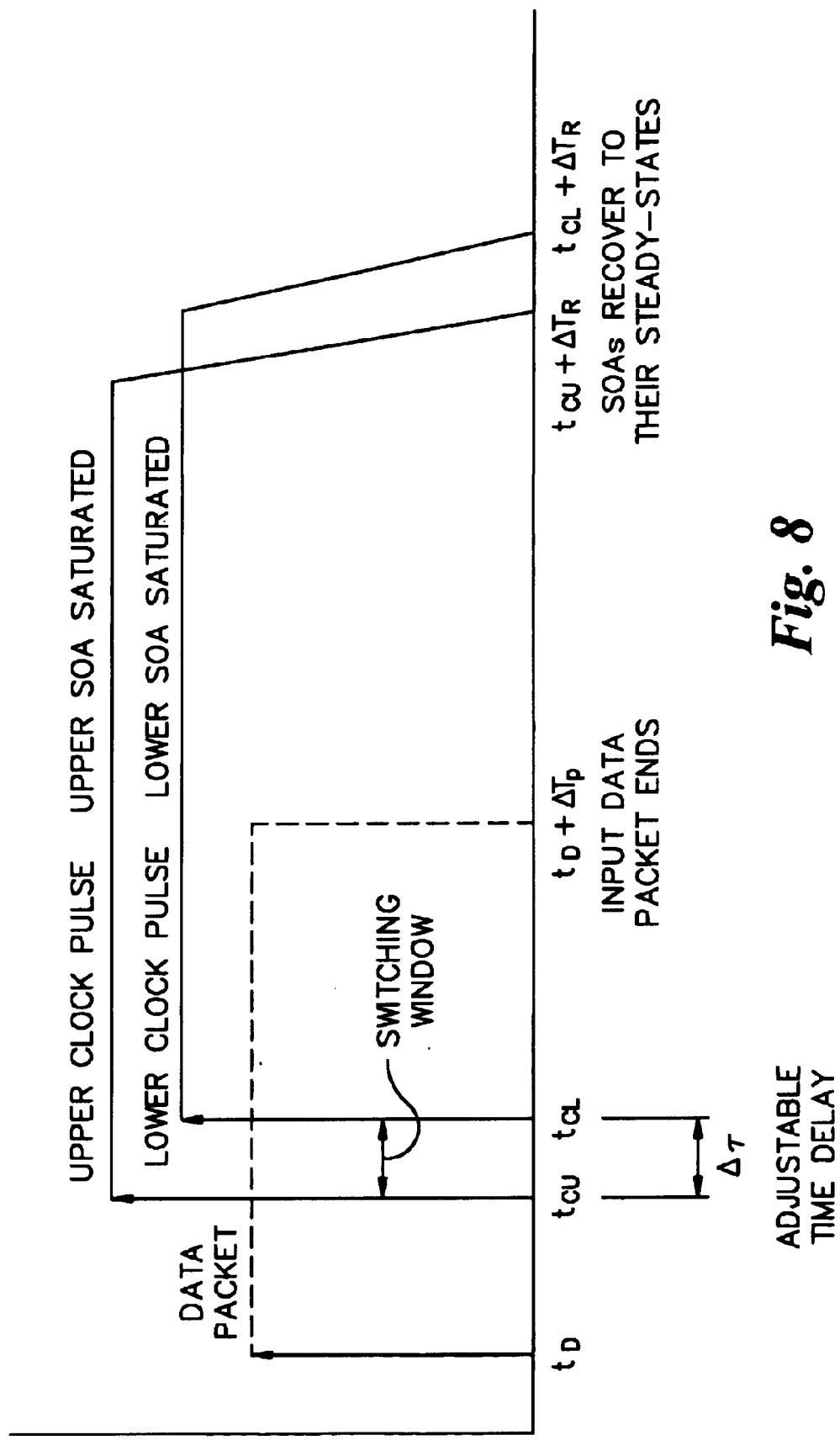
FIG. 8 shows a timing diagram of the routing/switching operation in accordance with the present invention.
Figure 9:
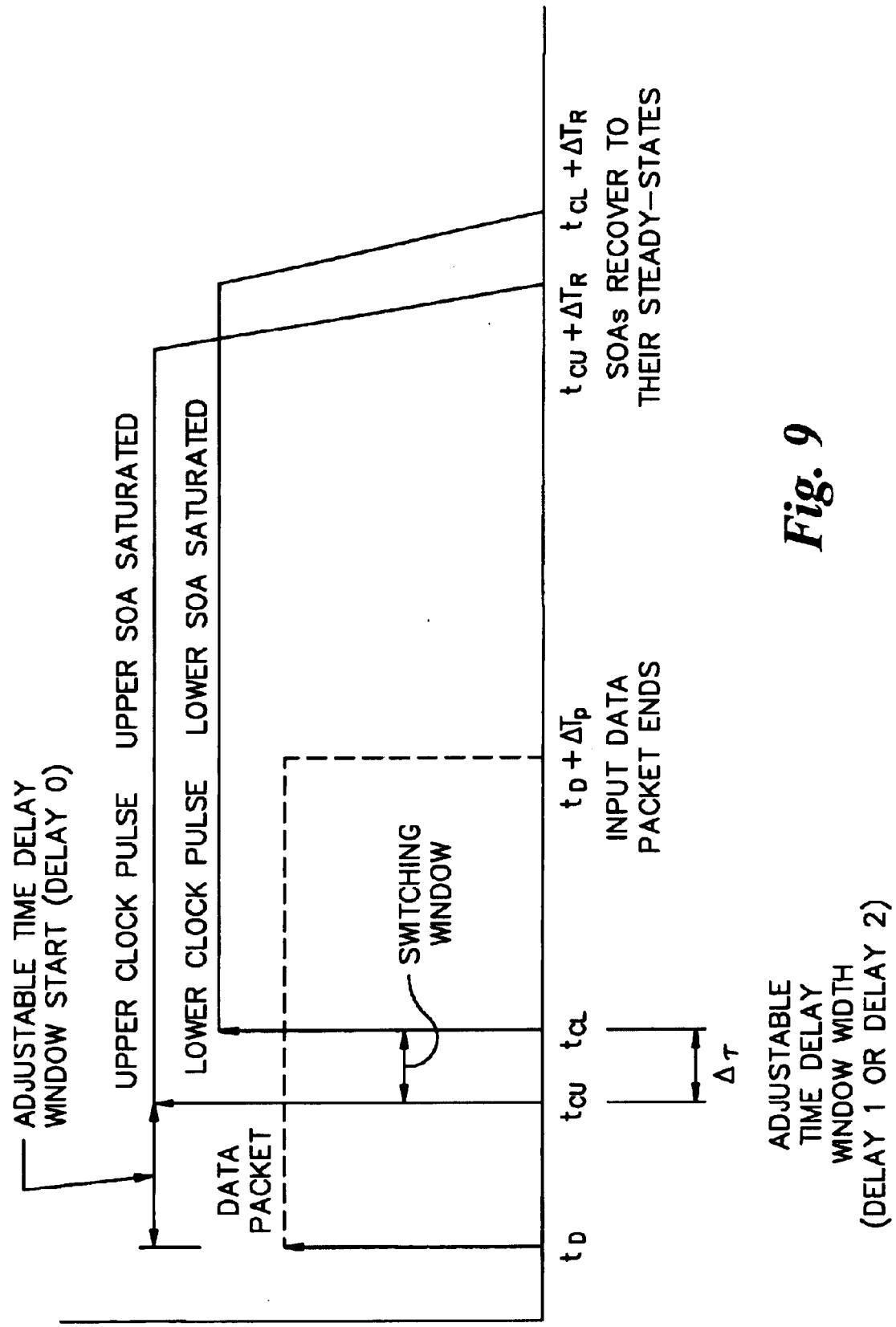
FIG. 9 shows a timing diagram of the routing/switching operation with an adjustable delay window start in accordance with the present invention.

FIGS. 8 and 9 show how the routing/switching functions of the present invention operate. The following parameters are defined:
$t_D$=time the data signal reaches the SOA facets
$t_{CU}$=time the clock (control) pulse reaches the upper SOA facet
$t_{CL}$=time the clock (control) pulse reaches the lower SOA facet
$\Delta T_P$=Data Packet Duration
$\Delta T_B$=Single Bit Duration=1/data rate
$\Delta T_R$=SOA recovery time
$\Delta \tau$=Adjustable time delay Referring to FIGS. 1, 3 and 8, the output signal will appear at "Path 1" when the data signal encounters both nonlinear optical elements 106, 108 in the same optical condition (both saturated or both in steady-state conditions). The output signal will appear at "Path 2" when the nonlinear optical elements 106, 108 are not in identical optical states. Only during the switching window are the nonlinear optical elements 106, 108 not in identical states. During the period of time, $\Delta \tau$, between $t_{CU}$ and $t_{CL}$, labeled as "Switching Window" in FIG. 8, the nonlinear optical elements 106, 108 are in different states. Thus, during the period of time $\Delta \tau$, the output is switched onto "Path 2." Ordinarily, the nonlinear optical elements 106, 108 are in identical states and the output is switched onto "Path 1." If the fixed time delay element 114 was instead located in the lower arm of the all-optical routing switch data input path, this would cause the output to ordinarily emerge onto "Path 2," and only during the switching window (when the nonlinear optical elements 106, 108 are not in identical states) will the output be routed to "Path 1." By adjusting the time delay element 112 in the lower clock arm, $\Delta \tau$, the switching window width can be adjusted and thus the data bits entering the SOA facets during this interval will be switched to the other output port.

In order to switch the $m^{th}$ through $n^{th}$ bits in a packet stream, the clock pulse timing must be set such that $t_{CU}$ occurs when the $m^{th}$ bit enters the device and $\Delta \tau$ must be set such that $\Delta \tau = t_{CL} - t_{CU} = T_{Bn} - T_{Bm}$, where $T_{Bn}$ and $T_{Bm}$ are the times the $m^{th}$ and nth bits enter the device relative to the start time of the packet. The time interval $\Delta \tau$ is set by the adjustable time delay element 112 in the lower path of the divided clock pulse.

Referring to FIGS. 2 and 4, it would be equally acceptable to adjust the time delay element 204 in the upper path of the split clock pulse. In order to set the start time of the switching window, $t_{CU}$, the time delay element 202, located at the clock signal input prior to splitting the pulse, is adjusted. For setting the switching window width, either time delay elements 112 or 204 may be adjusted.

Referring to FIGS. 2, 4 and 9, the present invention is a fully "time tunable" device. The present invention incorporates an adjustable time delay 202 at the clocking signal input 118 (Delay 0) to set the start time of the switching window. The present invention incorporates an adjustable delay 112, 204 in either the upper or lower arm of the split clock pulse (Delay 1 or Delay 2) to set the switching window width $\Delta \tau$.

The present invention may be implemented in either semiconductor hybrid form or in a completely monolithic form. The particular optimal design greatly depends upon the choice of the variable time delay mechanism and the structure of the optical coupler (e.g., quadrature coupler). The nonlinear optical elements (e.g., SOAs) may be implemented using III–V compound semiconductor materials, such as those typically grown on InP or GaAs substrates.

Figure 5:
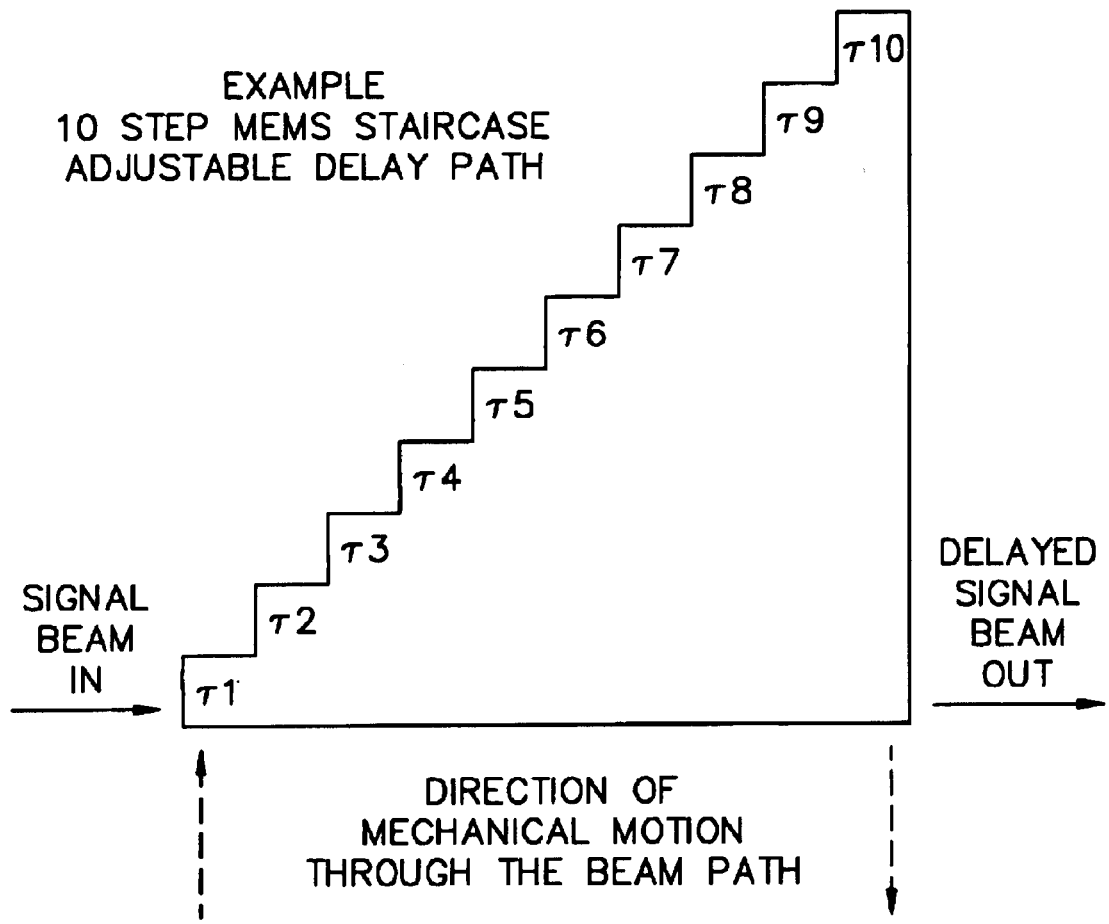
FIG. 5 shows the operation of an adjustable time delay in accordance with the present invention.

Referring to FIG. 5, if the variable time delay mechanism is to be implemented using MEMS (micro-electromechanical machines), then a hybrid form will be required such as silica on silicon substrate with the adjustable MEMS delays (or MEMS switchable delay lines) fabricated/mounted on-board. A direct MEMS delay will force the beam to pass through material of variable thickness, such as a wedge or staircase. The variable thickness material is translatable into and out of the light path via the MEMS and this, in-turn, provides a variable time delay. The material selected to affect the time delay must be of high enough index of refraction so as to allow for practical device dimensions commensurate with micro fabrication technology. Alternatively, the MEMS device may simply be used to direct the optical signal through different path lengths of optical waveguide monolithically fabricated on the silica substrate, using for example shutters of translatable mirrors, thus affecting the variable time delay. The III–V semiconductor chip containing the all-optical switch is mounted on-board the silicon substrate to interface with the MEMS variable time delays via optical waveguide interfaces which form the semiconductor hybrid realization of the all-optical switch.

Thermal or heating effects (resistive heating) can be used to realize the tunable time delays. In this case, a monolithic version may be the optimal approach, where all of the components of the all-optical switch are integrated on a single III–V semiconductor chip (see FIGS. 3 and 4). The heating element is located in close proximity to the optical waveguide whose propagation delay is to be adjusted. By passing an electrical current through the heating element, the mechanical and opto-electric properties of the semiconductor waveguide are changed. This, in-turn, changes the delay time of the optical wave passing through the device.

Yet another way to effect the variable time delay that is also amenable to a monolithic realization of the present invention, involves directly adjusting the index of refraction of a section of optical waveguide by passing an electrical current through the waveguide. This alters the carrier concentration (electrons and holes) within the material and therefore perturbs the joint density of states and thus changes the index of refraction. This effect translates into a change in the delay time through the material because the propagation velocity of the wave changes inversely with the effective index of refraction in the waveguide.

Various types of optical buffers may be used to realize the variable time delays. This would include, for example, a recirculating (feedback) optical waveguide loop that may be made from a length of fiber optic cable or a semiconductor waveguide. In this case, the wave to be delayed is forced to circulate around a loop until the specified amount of time has passed. Then the wave is released into the circuit to effect the routing of the optical bits at the appropriate instant of time. Feed forward delays realized in optical fiber can also be used, in which the wave is switched into different lengths of fiber before reaching the nonlinear optical elements 106, 108. This method of realization is clearly a hybrid structure.

Time delays can also be imposed upon a propagating wave via the electro-optic effect. An electric field can be applied to the material which alters the index of refraction. The perturbation in the index of refraction imparts a corresponding change in the optical wave's velocity which is the source of the time delay. Time delays controlled via the electro-optic effect can be realized in either the hybrid or monolithic forms of the present invention.

Implementation of the optical coupler 116 (e.g., quadrature coupler) at the output of the all-optical routing switch will also dictate the sort of realization that is required. An integrated multimode mode interference (MMI) coupler can be used to form the optical coupler 116 monolithically in the III–V semiconductor, along with the other components of the all-optical switch. The choice of hybrid or complete monolithic realization will depend upon the selection of the adjustable time delay mechanisms. The optical coupler 116 may also be realized in a monolithic fashion by using ring resonator technology. A hybrid version of the optical coupler would take advantage of silica on silicon waveguide technology and form the coupler in this material system. The III–V semiconductor chip may be mounted on the silicon substrate with the nonlinear optical element 106, 108 outputs feeding the input ports of the optical coupler 116. Alternatively, the coupler may be external to the chip itself. In this case, the optical coupler may be an externally packaged device, which is coupled to the output ports of the nonlinear optical elements 106, 108 by means of fiber optic "pigtailed" connections.

The present invention may be used as an integral component in all-optical digital communications network equipment. Such networks will not suffer from the typical optical-to-electrical-to-optical bottlenecking conversions of conventional systems. The present invention provides the ability to route individual bits or groups of bits being transmitted in an all-optical digital data format. The present invention can play a vital role in implementing extremely high data-rate ($\geq$40 GB/s) packet or bursty (IP) systems. Furthermore, the present invention may be used in fiber-to-the-home/business applications where all-optical data routing will be required in the network. The present invention allows for the advancement in data capacity because it can operate over an extremely wide range of data rates from a few MB/s to hundreds of GB/s. The present invention represents an essential component in an enabling technology that will lead the way in making high data-rate and high capacity networks an economically feasible venture. Since the present invention can be implemented using semiconductor chip processing technology, its cost may ultimately fall into a range where it is inexpensive enough to be inserted, in multiples, at nodes, minimodes, or head-end switching points in all-optical communication networks. One only needs to provide a short pulse optical source whose repetition rate can be set to the data rate of the current state-of-the-art requirements.

The present invention may be used in the test and measurement instrumentation associated with all-optical digital data communication networks. The present invention may also find applications in scientific research or medical applications where ultra-short optical pulses are used to analyze tissues or other matter.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An all-optical switch mounted in a semiconductor device, the switch comprising:
   (a) a first input for receiving a data stream;
   (b) a second input for receiving a clocking signal;
   (c) first and second nonlinear optical elements mounted in the semiconductor device and being in communication with the first input, the nonlinear optical elements for processing the data stream in response to the clocking signal;
   (d) a first variable time delay element mounted in the semiconductor device for receiving the clocking signal, the first time delay element having a first adjustable time delay value and being in communication with the second input and the second nonlinear optical element; and
   (e) an optical coupler having plural outputs, the optical coupler being in communication with the first and second nonlinear elements, wherein the first adjustable time delay value of the first adjustable time delay element determines the output of the optical coupler that individual data bits or groups of data bits in the data stream are desired to be routed to.

2. The switch of claim 1, wherein the optical coupler is a four port device placed at the output of the switch, the four port device having two input ports and two output ports.

3. The switch of claim 2, wherein outputs of the first and second nonlinear optical elements are fed into the input ports of the four port device.

4. The switch of claim 1, wherein the clocking signal controls the states of the first and second nonlinear optical elements.

5. The switch of claim 1, wherein the first variable time delay element comprises a material of variable thickness in the shape of one of a wedge and a staircase.

6. The switch of claim 1, wherein the first variable time delay element comprises a plurality of optical waveguides of various lengths.

7. The switch of claim 1, wherein the first variable time delay element comprises a heating element which changes the properties of an optical waveguide when an electrical current is passed through the heating element.

8. The switch of claim 1, wherein the first variable time delay element comprises a waveguide having a variable index of refraction.

9. The switch of claim 1, wherein the first variable time delay element comprises an optical buffer having a recirculating optical waveguide loop.

10. The switch of claim 1, wherein the first variable time delay element comprises a material upon which an electro-optic effect is imposed.

11. The switch of claim 1, further comprising:
(f) a second variable time delay element mounted in the semiconductor device for receiving the clocking signal, the second variable time delay element having a second adjustable time delay value and being in communication with the first nonlinear optical element.

12. The switch of claim 11, further comprising:
(g) a third variable time delay element mounted in the semiconductor device, the third variable time delay element for receiving the clocking signal, delaying the clocking signal and passing the delayed clocking signal to the first and second variable time delay elements for further delaying of the clocking signal.

13. A method of routing data through an all-optical switch mounted in a semiconductor device, the switch including (i) a first input for receiving a data stream, (ii) a second input for receiving a clocking signal, (iii) first and second nonlinear optical elements mounted in the semiconductor device and being in communication with the first input, the non linear optical elements for processing the data stream in response to the clocking signal (iv) a variable time delay element mounted in the semiconductor device, the variable time delay element having an adjustable time delay value and being in communication with one of the nonlinear optical elements, and (v) an optical coupler having plural outputs, the optical coupler being in communication with the first and second nonlinear optical elements, the method comprising:

(a) the first and second nonlinear optical elements receiving the data stream from the first input;

(b) controlling the states of the first and second nonlinear optical elements with the clocking signal; and (c) adjusting the time delay value of the variable time delay element depending upon which output of the optical coupler that individual data bits or groups of data bits in the data stream are desired to be routed to.

* * * * *